Feb. 26, 1957  L. D. STATHAM  2,783,342
ELECTRIC TRANSDUCER
Filed May 11, 1953  2 Sheets-Sheet 1
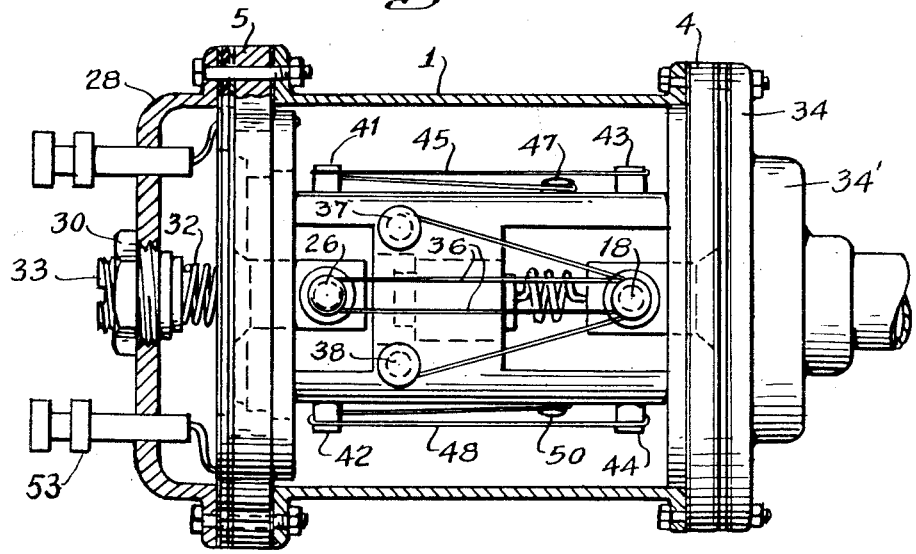
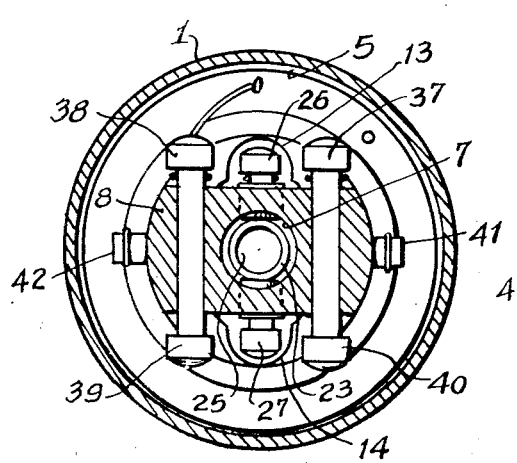
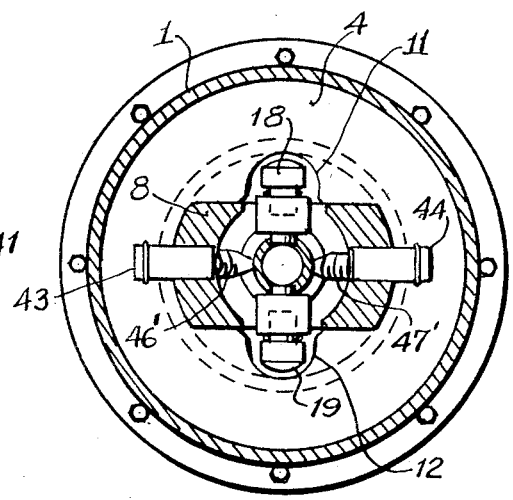
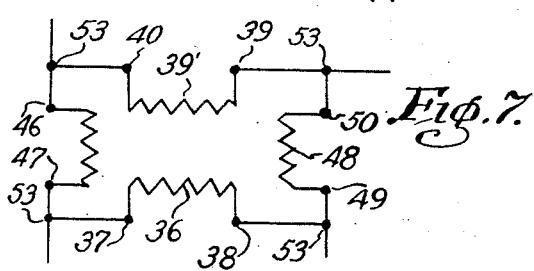
INVENTOR.
LOUIS D. STATHAM
BY
ATTORNEY.

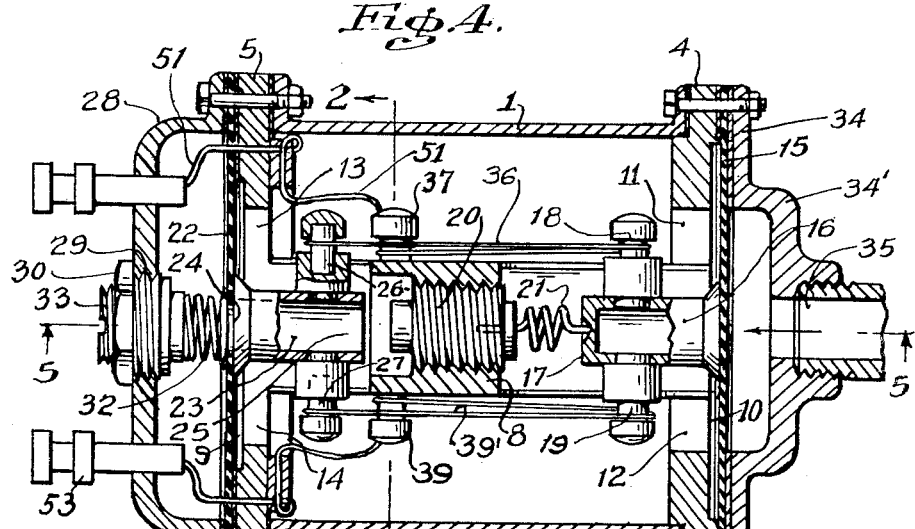
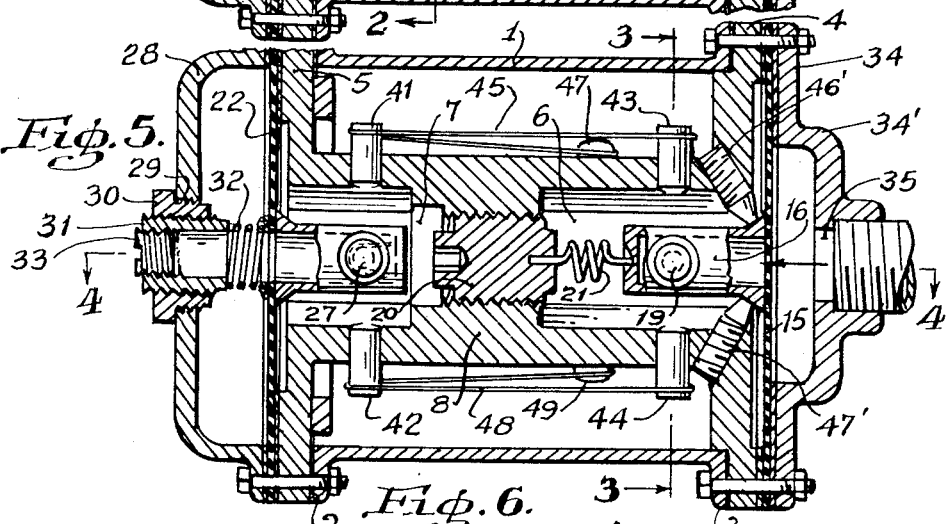
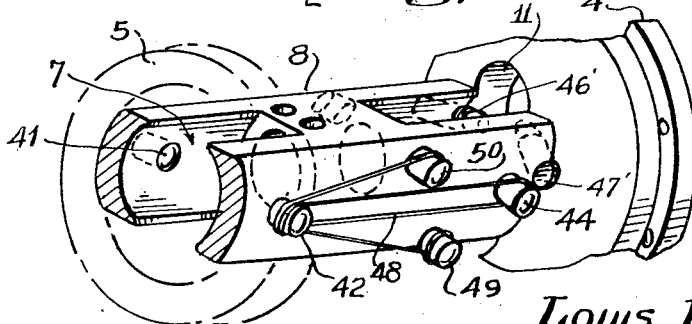

United States Patent Office 2,783,342
Patented Feb. 26, 1957

2,783,342

ELECTRIC TRANSDUCER

Louis D. Statham, Beverly Hills, Calif., assignor to Statham Laboratories, Inc., Los Angeles, Calif., a corporation of California Application May 11, 1953, Serial No. 354,295

15 Claims. (Cl. 201—63)

This invention relates to a transducer which may be employed as a motion sensing device and is particularly designed to faithfully report the motion and degree of motion to be sensed but is insensitive to acceleration. This is particularly useful where the force or motion to be measured is not related to acceleration of the transducer. Where the transducer is itself a seismic system, i. e., includes a mass mounted for oscillatory movement upon a spring, the acceleration of the transducer will cause a movement of the spring mass. Since the force or motion to be sensed also produces a like movement of the spring mass, the instrument is incapable of discriminating between the force or motion induced by acceleration and that caused by the motion or force it is designed to sense.

For many purposes, however, it is desirable in a motion or force sensing device that the device be insensitive to acceleration. An example of such a device is a pressure gage in an accelerating vehicle, i. e., an airplane. In such a pressure gage the pressure transmitting medium, i. e., a diaphragm mounted in a container, is connected to and actuates a transducer capable of sensing the movement of the diaphragm upon the application of pressure in the container and against the diaphragm. Since the diaphragm and the transducer have mass, the acceleration of the vehicle in which the pressure gage is mounted causes a like acceleration of the case of the gage. Due to the inertia of the diaphragm and the parts connected to the diaphragm capable of motion relative to the case, there is a motion of the diaphragm and connected parts relative to the case. Since this motion is indistinguishable from a like motion resulting from imposition of pressure, an error is introduced into the instrument. This same problem is also present where the transducer measures a movement of the diaphragm or other resilient suspension induced by any other force. The movable member of the transducer and its associated mechanism having mass, the acceleration of the case in which the transducer is mounted, i. e., as a result of the acceleration of the vehicle in which the case is mounted, will cause a deflection of the movable member with respect to the case, and the instrument will then read in error by the amount of this deflection of the movable member.

It is an object of my invention to devise a transducer in which acceleration effects do not introduce any substantial error into the reading of the transducer.

It is another object of my invention to devise a transducer which is substantially insensitive to the effect of acceleration.

I accomplish this object by devising a transducer having a relatively fixed member upon which two movable members are mounted, i. e., movable in relation to each other and to the fixed member, one of them so movable upon the application of a force or motion to be sensed, but substantially immovable with respect to each other, i. e., functionally rigidly connected when subjected to acceleration.

In one form of my transducer I employ a plurality of seismic systems, each composed of a sprung mass. Means are provided for connecting one of the masses to the motion or force to be sensed by the transducer. A motion sensing device is connected to the two masses in such manner that the approach or departure of the masses from each other may be sensed by the device. The masses are mounted on or in a resilient suspension on a framework. In such a structure the masses may be made to deflect on the framework equally and in unison upon acceleration of the frame, and thus no relative motion of the masses is indicated by the transducer. However, if a force or motion is applied to one only of the masses, as by a rod or by a pressure, a relative motion of the masses with respect to each other will occur. I preferably adjust the mass of each of said resiliently mounted masses or the spring rate of their resilient suspension or both so that the natural frequency of each of the spring masses is substantially the same. I, also, desirably adjust the spring rate of the resilient suspension so that the amplitude of deflection upon the application of an accelerating or oscillating force will be substantially the same. This may be desirably accomplished by adjusting the masses and also the spring rate of each of the resiliently suspended members substantially the same so that the natural frequency, the amplitude of oscillation, and the damping coefficient of each of the spring masses are the same.

In consequence of such adjustment of these parameters of design, the imposition of an oscillatory force or any variable force such as acceleration upon the transducer, the relatively movable masses will be displaced upon their resilient suspension equally and in phase and at the same frequency so that their relative positions with respect to each other will be unchanged. These masses thus act as if they were rigidly connected. However, by applying a force other than acceleration or oscillation of the transducer to one of the movable members or to both of the movable members, they may be caused to approach or depart from each other.

In the preferred embodiment of my invention, illustrated and described herein, I constructed a transducer in the form of an electrical variable resistance strain wire gage comprising a frame, a pair of flexible members, i. e., a pair of diaphragms, mounted in parallel and spaced arrangement on the framework. Upon each of the opposing faces of the diaphragm I mount a structure in which pins may be mounted and strain wires are stretched under tension between the pins on one of the diaphragms and the pins on the other of the diaphragms. The force to be measured is applied to one only of the diaphragms or to both diaphragms, if desired, to cause the pins to approach each other or depart from each other as a result of the deflection of the diaphragms. The variation in strain in the wire resulting from the motion of the diaphragms is determined by the conventional electrical arrangement common to strain wire gages. However, if the framework is caused to oscillate or accelerate, the two diaphragms are deflected in phase and synchronism and equally so that no variation in the separation of the pins occurs and no variation in strain of the wire results.

These and other objects of the invention will be further described by reference to the drawings, in which Fig. 1 is a vertical section through the transducer with parts in elevation;

Fig. 2 is a section taken on line 2—2 of Fig. 4;

Fig. 3 is a section taken on line 3—3 of Fig. 5;

Fig. 4 is a section taken on line 4—4 of Fig. 5;

Fig. 5 is a section taken on line 5—5 of Fig. 4, and is similar to Fig. 1;

Fig. 6 is a detail in perspective with parts broken away;

Fig. 7 is a schematic wiring diagram showing the connection of the wires in a Wheatstone bridge arrangement.

Cylindrical frame 8 is squared off at the top 2 and bottom 3 to give parallel faces and carries circular end flanges 4 and 5. The ends of the frame 8 are counterbored at 6 and 7 to form recesses which are separated by a wall 8. The flanges 4 and 5 are counterbored at 9 and 10 to form diaphragm chambers, as will be described below. The recess 6 is intercepted by slot 11 positioned in the upper face 2 of the frame and in the flange 4 and also by a slot 12 in the lower face 3 of the frame and in the flange 4. A slot 13 intercepting the recess 7 is provided in the upper face 2 of the frame 8 and in the flange 5, and a slot 14 intercepting the recess 7 is provided in the lower face 3 of the frame 8 and in the flange 5.

The diaphragm 15 is secured at its periphery to the flange 4 over the diaphragm chamber 10 to seal the chamber by suitable means such as welding the edge of the diaphragm to the flange. Mounted centrally of the diaphragm 15 is a hollow post 16 having an end closure 17 and carrying two diametrically opposed pins 18 and 19 axially aligned with their axes perpendicular to the axis of the hollow post 16. The stud 20 is screwed into the wall of frame 8 and carries a spring 21 which bears against the closure 17. The diaphragm 22 is mounted upon the flange 5 over the diaphragm chamber 9, as will be described below. The diaphragm 22 carries the tube 23 concentrically disposed with the central bore 24 in the diaphragm 22. The open end 25 of the tube 23 is axially aligned with the tubular member 16 and with the stud 20. The pins 26 and 27 are mounted on 23 parallel to the pins 18 and 19. The pins 26 and 27 are axially aligned and are perpendicular to the axis of the tubular member 23.

Pin 18 passes through the slot 6. The pin 19 passes through the slot 12. Pin 26 passes through the slot 13 and the pin 27 passes through the slot 7. The cap 28 is mounted on the flange 5 and clamps the diaphragm 22 between the cap and flange 5 by suitable bolts or studs. The cap is bored at 29 and tapped to receive an internally and externally threaded sleeve 30 which is screwed into the bore 29 and over the internally and externally threaded hollow stud 31 which carries attached at the end thereof a spring 32, one end of which is secured as by soldering to the diaphragm 22. The hollow stud 31 is sealed by a plug 33. Case 34 is mounted on the flange 4 and passes over the flange 4 and is closed by a cover 34' carrying a central inlet 35. Suitable gaskets and studs are used for assembly and to make fluidtight joints, as will be understood by those skilled in the art.

Electrical resistance strain wires 38 are looped around the insulating pins 26 and 18 under tension and connected to the insulated terminals 37 and 39, and electrical strain wires 45, 48 are looped under tension around insulating pins 27 and 19 and connected to insulated terminals 39 and 40. Insulated pins 41 and 42 are axially aligned in the frame 8 disposed 90° to the insulated pins 26 and 27 and insulated pins 43 and 44 are positioned in the frame 8 parallel to the pins 41 and 42. Strain wires 45 are mounted on pins 41 and 43 and are connected to insulated terminals 46 and 47 and strain wires 48 are mounted on pins 42 and 44 connected to insulated terminals 49 and 50. The terminals are connected by insulated conductors 51 to terminals 53 in the form of a Wheatstone bridge with the two wires 45 and 48 fixed or inactive while the wires 36 and 38 are active, that is, variable in resistance upon the approach or departure from eath other of pins 18 and 26, or the approach or departure from each other of pins 19 and 27, as pressure is increased or decreased upon the diaphragm 15 through the inlet 35. The angularly disposed screws 46' and 47' are stops to limit the deflection of the diaphragm to prevent overloading when excessive pressure is accidentally applied through 35.

To assemble the device, the frame 8 with the diaphragm and the cover 28 in place, but with the sleeve 30 of the plug 33 and cover 34' removed, is wound by winding the wires 36, 39', 45, and 48 on the pins and making the suitable connections. By cementing a post to the diaphragm 15 on the opposite side from that upon which the post 16 is mounted, the cemented post and the stud 31 may be grasped to hold the diaphragms in any desired position during the winding of the wires 36 and 39'. When winding is completed the cemented post is removed.

The weight of the diaphragm 15 and the members 16, 17, 18, and 19 supported thereon is made substantially equal to the weight of the diaphragm 22 and the structure supported on the diaphragm, to wit, tube 23, and the pin structures 26 and 27. Thus the weight of the diaphragm 15 and the members supported on the diaphragm 15 equals the weight of the diaphragm 22 and the members supported on the diaphragm 22. The case and cover are then mounted as described above and the sleeve 30 placed in position.

By removing the screw of plug 33, the screw 20 may be adjusted so as to adjust the compression of the spring 21. The threaded stud 31 may be adjusted to adjust the tension of spring 32 so as to adjust the position of the diaphragms 15 and 22 and to produce a substantially equal spring rate to the mass composed of the diaphragm 15 and to the mass of structure including the diaphragm 22.

It will thus be seen that when case 34 is accelerated or oscillated the diaphragm 15 and the diaphragm 22 will deflect substantially synchronously and at substantially the same frequency and at substantially the same amplitude. The amplitude and the frequency at which 22 will deflect may be adjusted by adjusting the tension in the spring 32 by adjusting screw 31, and the amplitude and frequency at which 15 will deflect may be adjusted by varying the compression in spring 21 by adjusting 20 by removing plug 33 and inserting a tool through the tubular stud 31, the bore 24 and tube 23 so that the diaphragms 15 and 22 deflect equally and in the same direction. Under those circumstances the separation of pins 26 from 18 and the separation of pins 27 from 19 is substantially unaltered and substantially no variation in resistance of the wires 36 and 39 will be observed. Thus the instrument may be subjected to acceleration or oscillation forces and adjustment of screws 20 and 31 made until by observation the resistance of the wires 39 and 36 appears substantially unchanged upon imposition of the acceleration or oscillation.

However, when pressure is imposed through 35, the diaphragm 15 will deflect while the diaphragm 22 will not. The diaphragms are mechanically isolated from each other in the sense that the motion of the diaphragm 15 is not imparted to diaphragm 22 since the strain wires will not transmit a compressive force, the inward motion of the diaphragm 15 acting merely to relieve the tension introduced in the original winding of the wires. The pins 18 and 19 approach the pins 26 and 27 and with the proper electrical circuits, as will be understood by those skilled in the art, this variation in tension of the wires may be made to indicate the degree of pressure exerted. Since, as will be understood by those skilled in the art, diaphragm 15 will deflect in a similar manner if the force imposed upon it is a force other than fluid pressure, such as a rod connected to the diaphragm, the device is applicable as a transducer to indicate any force or motion which may be sensed by connecting it to the diaphragm 15.

While I have described a particular embodiment of my invention for the purpose of illustration, it should be understood that various modifications and adaptations thereof may be made within the spirit of the invention as set forth in the appended claims.

I claim:

1. A transducer comprising a frame, a diaphragm mounted on said frame, a wire mounting connected to said diaphragm, an electrical resistance strain wire connected to said wire mounting, a resilient connection between said wire and said frame, a spring mounted in said frame, said spring being connected to said diaphragm, and means for adjusting said spring.

2. A transducer comprising a frame, a diaphragm mounted on said frame, a bore in said frame axially aligned with said diaphragm, a screw in said bore, a spring connected to said screw and to said diaphragm, a wire mounting connected to said diaphragm, an electrical resistance wire connected to said wire mounting, and a resilient connection between said wire and said frame.

3. A transducer comprising a frame, a diaphragm mounted on said frame, a post mounted centrally of said diaphragm, a bore in said frame axially aligned with said post, a screw in said bore, a spring connected to said screw and to said post, an electrical resistance strain wire connected to said post, and a resilient connection between said wire and said frame.

4. A transducer comprising a frame, a diaphragm mounted on said frame, a second diaphragm mounted on said frame in parallel alignment with said first-mentioned diaphragm, a wire mounting connected to each of said diaphragms, and an electrical resistance strain wire stretched in tension between and mounted upon said wire mountings.

5. A transducer comprising a frame, a diaphragm mounted on said frame, a second diaphragm mounted on said frame in spaced apart relationship to said first-mentioned diaphragm, a wire mounting connected to each of said diaphragms, and an electrical strain wire stretched in tension between and mounted upon said wire mountings.

6. A transducer comprising a frame, a diaphragm mounted on said frame, a second diaphragm mounted on said frame spaced from said first-mentioned diaphragm, a wire mounting connected to each of said diaphragms, an electrical resistance strain wire stretched in tension between and mounted on said wire mountings, and a spring bias for one of said diaphragms.

7. A transducer comprising a frame, a diaphragm mounted on said frame, a second diaphragm mounted on said frame spaced from said first-mentioned diaphragm, a wire mounting connected to each of said diaphragms, an electrical resistance strain wire stretched in tension between and mounted upon said wire mountings, and a spring bias for both of said diaphragms.

8. A transducer comprising a frame, a diaphragm mounted on said frame, a post centrally mounted on said diaphragm, a second diaphragm mounted on said frame in parallel alignment with said first-mentioned diaphragm, a hollow post centrally mounted on said second-mentioned diaphragm, a bore in said frame, in axial alignment with said second-mentioned hollow post and positioned on said frame between said diaphragms, a screw in said bore, a spring connected to said screw and to said first-mentioned post, wire mountings on each of said posts, and an electrical resistance strain wire stretched in tension between and mounted upon said wire mountings.

9. A transducer comprising a frame, a diaphragm mounted on said frame, a post centrally mounted on said diaphragm, a second diaphragm mounted on said frame in parallel alignment with said first-mentioned diaphragm, a hollow post centrally mounted on said second-mentioned diaphragm, a bore in said frame in axial alignment with said second-mentioned hollow post and positioned in said frame between said diaphragms, a screw in said bore, a spring connected to said screw and to said first-mentioned post, a hollow screw mounted in said frame in axial alignment with said bore, said second diaphragm being mounted between said hollow screw and said bore, a bore in said second diaphragm in axial alignment with said hollow screw, a spring connected to said hollow screw and to said second diaphragm, and an electrical resistance strain wire stretched in tension between and mounted upon said wire mountings.

10. A transducer comprising a first movable member, a second movable member, a third member, each of said movable members including a spring mass resiliently connected to the third member, said masses being held in spaced-apart relation on such resilient connection, a force-transmitting means connected with one of said movable members, an electrical resistance strain wire, connections between said strain wire and each of said movable members, said strain wire being stretched in tension between said movable members.

11. A transducer comprising a first movable member, a second movable member, each of said members including a spring mass, said masses having substantially equal natural frequencies, said masses being held in spaced-apart relation, a force-transmitting means connected with one of said movable members, an electrical resistance strain wire, and connections between said strain wire and each of said movable members, said strain wire being stretched in tension between said movable members.

12. A transducer comprising a first movable member, a second movable member, a third member, each of said movable members including a spring mass resiliently connected to the third member, said movable members having substantially equal masses and having a substantially equal spring rate for the said spring masses, said masses being held in spaced-apart relation on said resilient connection, a force-transmitting means connected with one of said movable members, an electrical resistance strain wire, and connections between said strain wire and each of said movable members, said strain wire being stretched in tension between said movable members.

13. A transducer comprising a relatively fixed member, a first movable member, movable with respect to said fixed member, a yieldable connection between said fixed member and said first movable member, a second movable member, a yieldable connection between said second movable member and said fixed member, said yieldable connections holding said movable members separated from each other and movable with respect to each other and each of said members being movable with respect to said fixed member, a force-transmitting connection connected to one of said movable members, an electrical resistance strain wire, and connections between said strain wire and each of said movable members, said strain wire being stretched in tension between said members.

14. A transducer comprising a relatively fixed member, a first movable member, movable with respect to said fixed member, a yieldable connection between said fixed member and said first movable member, a second movable member, a yieldable connection between said second movable member and said fixed member, said yieldable connections holding said movable members separated from each other and movable with respect to each other and each of said movable members being movable with respect to said fixed member, a force-transmitting connection connected to one of said movable members, an electrical resistance strain wire, and connections between said strain wire and each of said movable members, said strain wire being stretched in tension between said movable members.

15. A transducer comprising a relatively fixed member, a first movable member, movable with respect to said fixed member, a yieldable connection between said fixed member and said first movable member, a second movable member, a yieldable connection between said second movable member and said fixed member, said yieldable connections holding said movable members separated from each other and movable with respect to each other and each of said movable members being movable with respect to said fixed member, the mass of said yieldably connected members being substantially equal and said yieldable connections having substantially equal spring rate, a force-transmitting connection connected to one of said movable members, and an electrical resistance strain wire and connections between said strain wire and each of said movable members, said strain wire being stretched in tension between said movable members.

References Cited in the file of this patent
UNITED STATES PATENTS 2,455,883   Statham _____ Dec. 7, 1948